US009781476B2

(12) United States Patent
Kennedy et al.

(10) Patent No.: US 9,781,476 B2
(45) Date of Patent: Oct. 3, 2017

(54) AUTOMATIC LEARNING CHANNEL CUSTOMIZED TO A PARTICULAR VIEWER AND METHOD OF CREATING SAME

(71) Applicant: EchoStar Technologies L.L.C., Englewood, CO (US)

(72) Inventors: John T. Kennedy, Denver, CO (US); Chad R. Terning, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 649 days.

(21) Appl. No.: 13/732,321

(22) Filed: Dec. 31, 2012

(65) Prior Publication Data
US 2014/0189743 A1 Jul. 3, 2014

(51) Int. Cl.
*H04N 21/466* (2011.01)
*H04N 21/482* (2011.01)
*H04N 21/84* (2011.01)
*H04N 21/442* (2011.01)

(52) U.S. Cl.
CPC ..... *H04N 21/44222* (2013.01); *H04N 21/466* (2013.01); *H04N 21/482* (2013.01); *H04N 21/84* (2013.01)

(58) Field of Classification Search
CPC ............ H04N 21/14; H04N 21/44222; H04N 21/466; H04N 21/482; H04N 21/84
USPC .......................................................... 725/46
See application file for complete search history.

(56) References Cited

U.S. PATENT DOCUMENTS

| 7,912,824 | B2 | 3/2011 | Anguiano | |
|---|---|---|---|---|
| 8,132,205 | B2 | 3/2012 | VanDuyn et al. | |
| 2003/0028871 | A1* | 2/2003 | Wang | H04H 60/65 725/9 |
| 2003/0046696 | A1* | 3/2003 | Mizuno | H04H 60/46 725/46 |
| 2003/0061239 | A1* | 3/2003 | Yoon | G06F 17/30017 |
| 2004/0261096 | A1* | 12/2004 | Matz | H04N 7/163 725/28 |
| 2005/0120369 | A1* | 6/2005 | Matz | H04N 7/163 725/40 |
| 2005/0144499 | A1* | 6/2005 | Narahara | H04H 60/31 714/1 |
| 2007/0276759 | A1* | 11/2007 | Ginter | G06F 21/00 705/53 |
| 2008/0133601 | A1* | 6/2008 | Cervera | G06Q 30/02 |

(Continued)

*Primary Examiner* — Nathan Flynn
*Assistant Examiner* — Tung T Trinh
(74) *Attorney, Agent, or Firm* — Seed IP Law Group LLP

(57) ABSTRACT

Various embodiments facilitate generation, distribution, and presentation of a video program on a virtual channel. In one embodiment, an electronic program guide ("EPG") manager is provided for execution on a receiving device, such as a set-top box. The EPG manager receives from a program distributor a video stream that has plurality of video programs having program content. Each program has been preassigned for presentation on a particular channel. A virtual channel is linked to one or more users. The EPG manager tracks the types of programs that a user watches and records metadata associated with the programs that the user actually views. When sufficient data is stored in the data base, the virtual channel is provided that program that a user will likely wish to view based on this past viewing history.

15 Claims, 5 Drawing Sheets

(56) References Cited

U.S. PATENT DOCUMENTS

2009/0259518 A1* 10/2009 Harvey .............. G06Q 10/0639
705/7.29

* cited by examiner

Electronic Programming Guide Display

| Channel | Number | 8:00PM | 8:30PM | 9:00PM | 9:30PM |
|---|---|---|---|---|---|
| Outdoor Adventures | 12 | Fishing | Moose Hunting | Snowmobile Heaven | |
| ESPN Sports | 144 | Soccer | | | Darts |
| Movie | 176 | The Good, the Bad and The Ugly | | Die Hard | |
| CNN | 200 | This Week | World Sports | World News | |
| World Channel | 344 | Adventure Racing | | Travel | |
| ... | ... | ... | | | |

FIG. 2
*(PRIOR ART)*

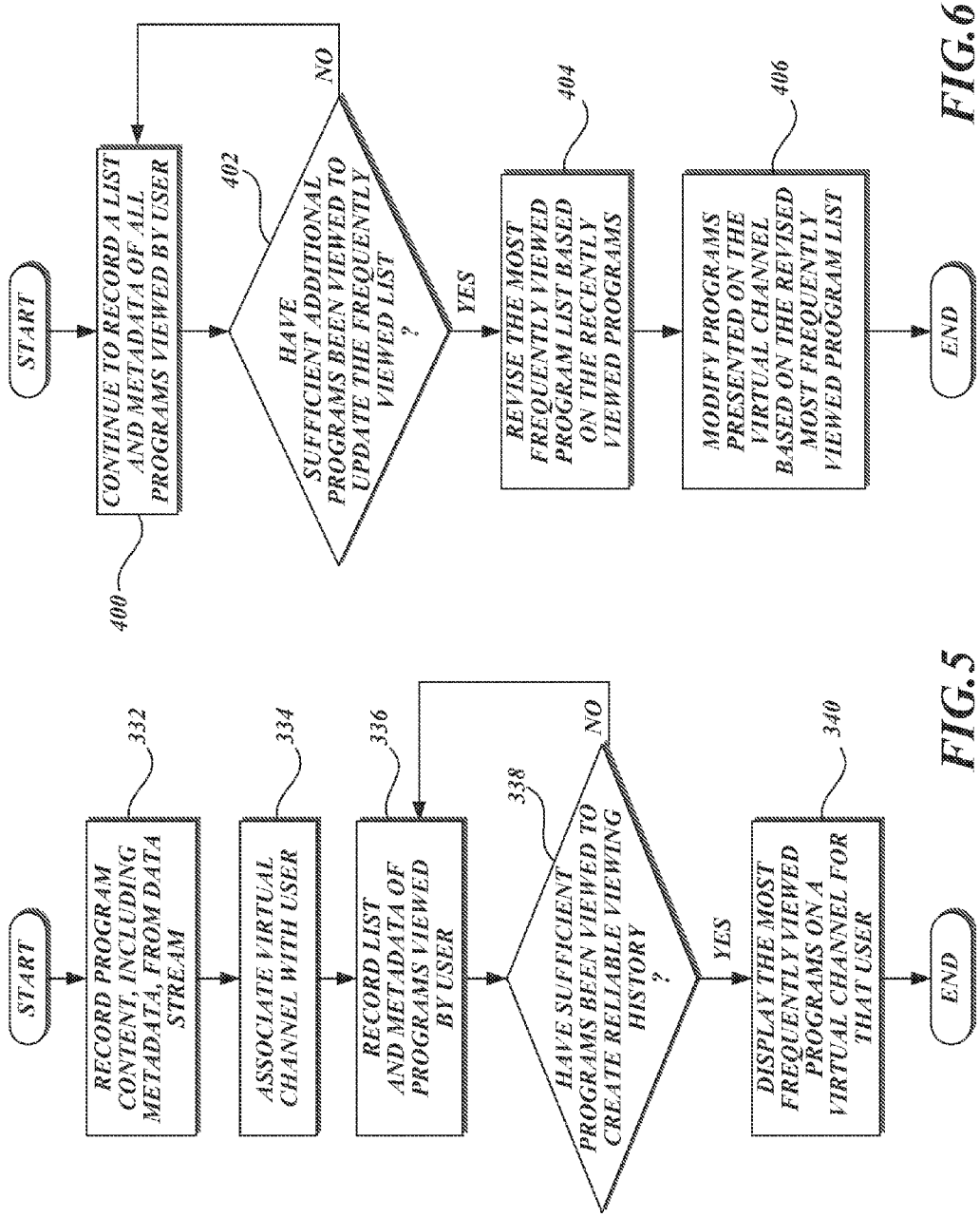

AUTOMATIC LEARNING CHANNEL CUSTOMIZED TO A PARTICULAR VIEWER AND METHOD OF CREATING SAME

TECHNICAL FIELD

This disclosure relates to a heuristic learning channel and, in particular, to an automatic learning channel that is customized to a particular viewer and a method of creating the same.

BACKGROUND

Most users of video programs have a particular set of viewing habits based on the type of programs that they prefer to watch. For example, many users, often men, prefer to watch football, either college football or professional football or other programs. Some users are particular to watch games of their alma mater, for example, a graduate of the University of Washington may have a particularly high interest in watching all games played by the University of Washington Huskies, whether football, basketball, soccer, volleyball, or the like. Similarly, a person may have a particular interest in a professional team like the Los Angeles Lakers. Other users may wish to watch all movies starring John Wayne.

Some users frequently like to change channels. There may be any number of reasons why a user changes channels frequently. One reason might be to alternate between two important sporting events, such as watching two college football games at the same time. Another reason might be to look at the weather in the local area during commercials of the main program the user is watching. Unfortunately, frequently changing stations can be a distraction to others in the room. Another problem is the difficulty in finding the station a user wishes to change to and, once found, quickly keying in the correct channel.

BRIEF SUMMARY

According to one embodiment, one or more virtual channels are set aside for particular users of an audio visual system. The virtual channel will present the programs that a particular viewer most likely wishes, based on their viewing habits. The programs to be presented on a particular users channel will be decided by a heuristic learning approach. Specifically, the system tracks the viewing habits of a particular user and records all the metadata associated with the program, including the genre of the particular type of shows that are watched, the names of each of the main characters in the shows, the time of day of each of the shows, and other particular details. After a period of time, such as one week or more, the system has recorded sufficient information to make a heuristic determination of the viewing habits of that particular user. The system thereafter displays on a virtual channel assigned to that particular user, the programs which the user is most likely to enjoy watching based on past viewing history.

Accordingly, once sufficient information is collected on a particular user for the system to predict the shows likely to be watched, the user can then turn to their virtual channel and watch that channel continuously, on a long term basis and not have to change channels or search for different programs. Rather, according to one embodiment, the particular program that the user would enjoy viewing at that moment is presented on the virtual channel, even though it is also showing on a different channel. Then, when another program comes on that the user would be expected to want to watch based on viewing history, that new program is also presented sequentially on the viewer's personal channel so that they can continue to view the channel watching a different program on the same virtual channel even though it is being sent to the receiver bearing a different channel number. This permits a user to continuously watch the same channel and have presented to them the programs which their viewing habits indicate to the system they would most likely prefer to see of all the channels that are available.

The heuristic approach adopted by the system can establish a viewing history using a number of criteria. In a first embodiment, the system records the user's viewing habits over a window of a selected period of time. For example, the system may have a dynamic sampling window, for example, the most recent two to three weeks. Each day, the system adds one day into the window and drops the last day off in the data analysis in determining which programs the user prefers to view. In another embodiment, the system accumulates all viewing habits of the particular user for long periods of time, for example, in excess of a year and makes a heuristic determination based on which shows the viewer prefers to see when competing shows that the view has watched in the past are both on at the same time. For each additional day that the user views TV, this data is collected and added to the database and is used to determine whether the current virtual channel presentation should be modified based on the new data as compared to the already obtained data.

In yet another embodiment, the system tracks the starting and ending of particular sports seasons, for example football season, baseball season, or basketball season. The system may store particular season viewing habits of a user and analyze that any time a particular team, for example the Los Angeles Lakers, is playing basketball that the user will always watch the Lakers no matter what station they are on and no matter what other things are on the TV. Accordingly, by recognizing that a particular user will always watching a particular sporting event, the system will always provide that sporting event on the user's virtual channel and have it take precedence over any other options.

In one embodiment, the virtual channel for a particular user is identified by the user putting in a key code, labeling the channel and providing his identity to that particular channel. In another alternative embodiment, a particular channel is assigned to a user and the system users a heuristic approach to determine the viewing habits of that particular user. In another alternative approach, the system collects data on the all the different shows watched over an extended period of time, for example one or several months, and using a heuristic analysis approach, makes a determination of whether one or more users are using the system. For example, during certain times of the day the system will recognize that children's programming are cartoons are always on, while on a Sunday afternoon football is always watched, whereas in the middle of the day the system recognizes that a particular movie channel or maybe a shopping channel is always watched. The system then will recognize that at least three different viewers are using the same TV, for example one or more children, an adult male, or a teenage female.

The system may also recognize that every afternoon, shortly after three o'clock, programming that is popular with teenage girls is viewed, corresponding to the time that junior high or high school students arrive home. The system will therefore recognize that there is likely a teenage female in the home and analyze the data for placement on a particular virtual teenage female channel custom to this person, which data will not affect or impact the data to be presented on the general family or adult male virtual channel.

BRIEF DESCRIPTION OF THE DRAWINGS

FIG. 2 is a schematic of a user interface screen of an electronic program guide according to the current state of the art.

FIG. 5 is a flow diagram of an example electronic program guide process according to one embodiment.

FIG. 6 is a flow diagram of an example of a program guide process according to one embodiment.

DETAILED DESCRIPTION

A. Overview

Figure 1:
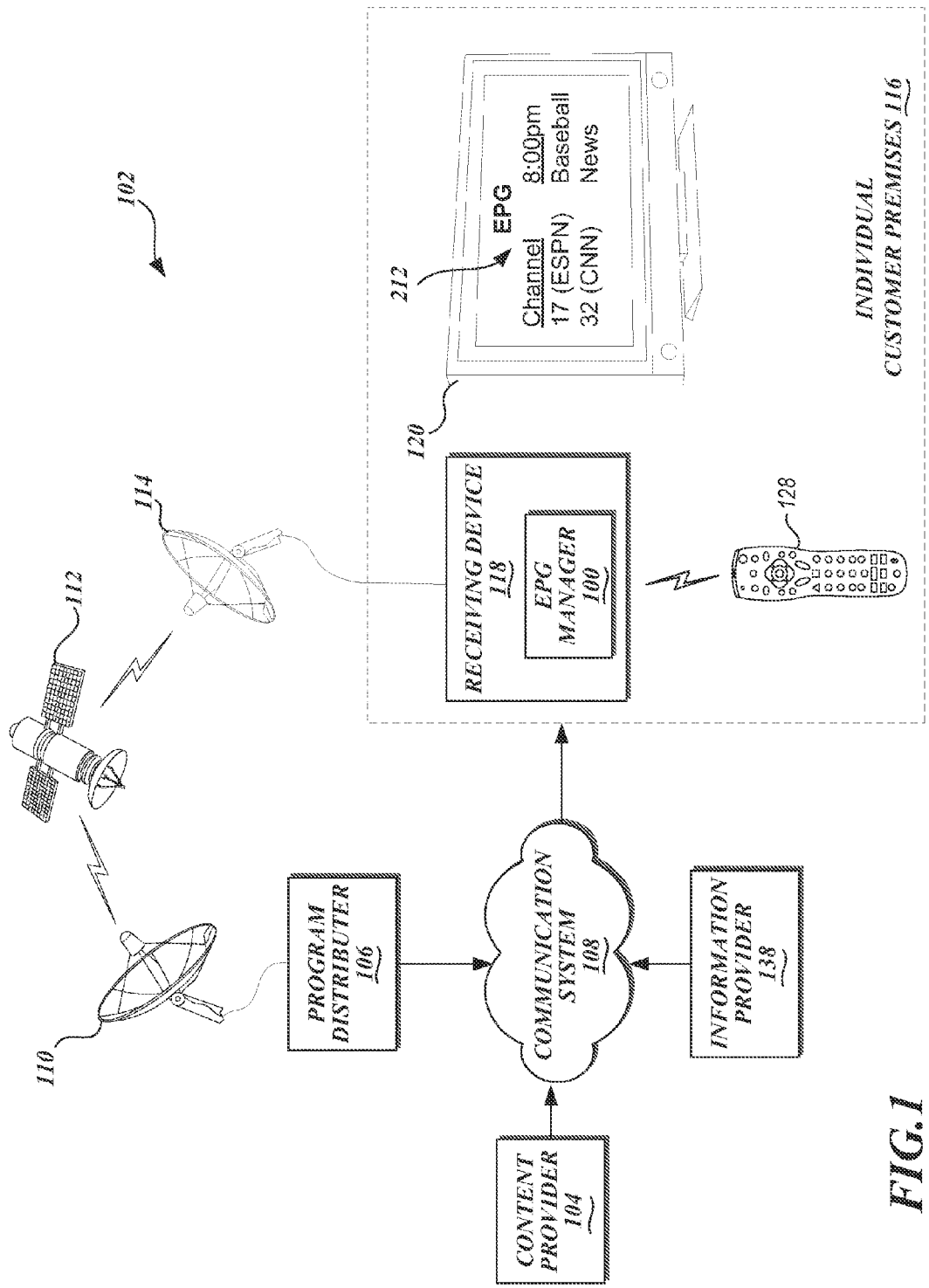
FIG. 1 is a block diagram illustrating an example content distribution environment in which embodiments of an electronic program guide manager may be implemented.

FIG. 1 is an overview block diagram illustrating an example content distribution environment 102 in which embodiments of an Electronic Program Guide ("EPG") manager 100 may be implemented. In this example, the EPG manager 100 operates upon a receiving device 118 and is configured to receive a large number of channels and a channel description list. The channel list 212 has an associated category of programming for each event, such as sports, news, comedy, or the like. The channel list 212 includes indicators of multiple channels that each carry programming in each particular category. Each event on a particular channel has a large amount of data which is associated with that particular event. For example, each event on a channel will have data embedded within the channel metadata identifying whether the event fits into a particular broad category, such as a sport, news, movie, comedy, weather, or the like. In addition, each event will have information particular to that event. For example, if it is a sporting event, it will be identified as to which sport, whether football, basketball, baseball, or the like. It will also identify whether the sporting event is professional, college, or amateur. It will also identify the particular teams that are part of the sporting events, for example the Ravens versus the Washington Redskins, or the University of Washington versus Oregon State. It also contains the date of the event, the date the program was created, and whether the event is previously recorded or if it is currently live. This type of information is provided for every program. As another example, if it is a movie, the data which is associated with that particular event will include such details as the names of all the major actors in the movie, the date the movie was recorded, the genre for the movie, such as suspense thriller, western, etc., and may also include particular details about the location of the movie, for example, shot in a foreign country, presented in a foreign language with or without subtitles, and other information about the particular event. It is known that each event broadcast through the paid subscription services, such as cable TV, satellite TV, come with such embedded information regarding the particular event and have done for several years. Accordingly, when a user watches an event, the system records the particular event which was watched and also stores with that event all of the data associated with the type of event, including the category, the names of the teams which played, if a program with actors, the names of the actors, and all other similar information associated with that particular event.

In response to a user request to view the channel list, the EPG manager 100 presents, via presentation device 120, an electronic program guide 212 that includes at least some of the multiple channels of the channel list.

This application bears some overlap in the use of a common hardware system having an electronic programming guide and an electronic programming guide manager and storage system as found and described in U.S. Patent Publication No. 2011/0030010. While the hardware system on which the present invention operates is similar to that shown and described in the '010 published application, the operation of the embodiments and the inventive features are substantially different, as is the software programming in heuristic features that are part of the new concepts disclosed herein.

Before providing additional details regarding the operation and constitution of the EPG manager 100, the content distribution environment 102 of the EPG manager 100 will briefly be described. In the content distribution environment 102, audio, video, and/or data service providers, such as, but not limited to, television service providers, provide their customers a multitude of audio/video and/or data programming (hereafter, collectively and/or exclusively "programming"). A single program is called a program herein. Such programming is often provided by use of a receiving device 118 communicatively coupled to a presentation device 120 configured to receive the programming.

The receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive programming. Further, the receiving device 118 may itself include user interface devices, such as buttons or switches. In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display, one or more speakers, and/or other output devices to communicate video and/or audio content to a user. In many implementations, one or more presentation devices 120 reside in or near a customer's premises 116 and are communicatively coupled to the receiving device 118. Further, the receiving device 118 and the presentation device 120 may be integrated into a single device. Such a single device may have the above-described functionality of the receiving device 118 and the presentation device 120, or may even have additional functionality.

A content provider 104 provides program content, such as television content or audio content, to a distributor, such as the program distributor 106. Example content providers include television stations which provide local or national television programming, special content providers which provide premium based programming of particular or pay-per-view programming, or radio stations which provide audio programming.

Program content is communicated to the program distributor 106 from the content provider 104 through suitable communication media, generally illustrated as communication system 108 for convenience. The program content includes a video program for a user sees on the TV or other presentation device 120. The program content also includes descriptive data associated with that particular program. The descriptive data associate with a particular program is also called the metadata. This metadata provides a great deal of information about the content of the program itself. For example, the metadata will identify in text or other computer readable form an indication of the genre of the program, such as movie, sports, news, etc. It will also list the year the program was first created, and in some cases, the time and date the program was created, for example, in the case of a sports program such as a football game. It will also indicate whether it is a live program. The descriptive criteria within the metadata will also provide the names of the main characters of actors, for example, if a sports event, the team names and if a movie, the names of the actors. The descriptive data includes a great deal of additional information about the content of the program itself, not all of which are listed here but are known to those of skill in the art.

Communication system 108 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems.

In one embodiment, the received program content is converted by the program distributor 106 into a suitable signal that is communicated by antenna 110 to satellite 112. The transmitting antenna 110, satellite 112 and receiving antenna 114 are one embodiment of the communication system 108 and are shown in more graphic form for illustration purposes only and not as a duplicate to the system 108. The communicated uplink signal may contain a plurality of multiplexed (e.g., time division multiplexed) programs that are organized into distinct logical or physical channels. The uplink signal is received by the satellite 112 and then communicated (i.e., "downlinked") from the satellite 112 in one or more directions, for example, onto a predefined portion of the planet.

The receiver antenna 114 that is within reception range of the downlink signal communicated from satellite 112 receives the above-described downlink signal. Some types of receiver antenna 114 are operable to receive signals from a single satellite 112. Other types of receiver antenna 114 are operable to receive signals from multiple satellites 112 and/or from terrestrial based transmitters. In some embodiments, antenna 114 is a terrestrial "over-the-air" ("OTA") broadcast antenna that is configured to receive a program signal from a terrestrial based transmitter, such as broadcast transmit tower. Furthermore, in some cases, the receiving device 118 is operable to receive signals from multiple, distinct antennas.

The receiver antenna 114 can be located at customer premises 116. Examples of customer premises 116 include a residence, a business, or any other suitable location operable to receive signals from satellite 112. The received signal is communicated, typically over a hard-wire connection, to a receiving device 118. The receiving device 118 converts the received signal from antenna 114 into a signal and/or format suitable for communication to a presentation device 120 or another device, such as a digital video recorder or a home computing system. In some embodiments, the receiver antenna 114 may be remotely located from the customer premises 116. For example, the antenna 114 may be located on the roof of an apartment building, such that the received signals may be transmitted, after possible recoding, via cable or other mechanisms, such as Wi-Fi, to the customer premises 116.

The receiving device 118 may receive programming partially from, or entirely from, another source other than the above-described receiver antenna 114. Other embodiments of the receiving device 118 may receive data from program distributors 106 and/or content providers 104 via locally broadcast RF signals, cable, fiber optic, Internet media, or the like.

In addition, information provider 138 may provide various forms of content and/or services to various devices residing in the customer premises 116. For example, information provider 138 may provide a Web page (or other information) to the receiving device 118 or other computing device. Information provider 138 may further perform or facilitate electronic commerce transactions.

In the illustrated example, the EPG manager 100 operates upon the receiving device 118. The EPG manager 100 is configured to receive one or more channels are preassigned to a particular program. Namely, each program is associated with a particular preassigned channel. The program is shown in the electronic programming guide in a particular time slot and listed next to the channel that is has been preassigned in the video stream that comes from the information provider 138 or program distributor 106 or some other entity. Each channel list is associated with a particular category of programming and includes indicators (e.g., channel numbers or network names) of multiple channels that each carry at least some programming in the associated category. The channel lists are transmitted to the receiving device 118 from time to time and stored thereon by the EPG manager 100. A user, interacting with the receiving device 118 and/or the presentation device (e.g., via remote 128), can then request to view a specified channel list. In response, the EPG manager 100 generates and initiates presentation of the electronic program guide 212 for display upon the presentation device 120. The electronic program guide 212 is a tabular display of at least some of the channels of the specified channel list. In addition, the electronic program guide 212 is interactive, in that the user can, by generating inputs with the remote 128, select a displayed channel for viewing, browse to other channels, browse to times in the future or past, and the like. By using a channel list, a user desiring to access a particular type of programming, such as drama or sports, can easily request to view all channels that carry programming of that type.

Channel lists can be generated for various programming categories. Example programming categories include sports, movies, women's, men's, children's, drama, pay-per-view, video on demand, outdoor, shopping, entertainment, news, weather, international, and the like. In some embodiments, category hierarchies may be established. For example, a sports category may have subcategories of football, baseball, basketball, golf, soccer, and the like. Likewise, a movies category may have subcategories of drama, comedy, action, western, horror, and the like. In addition, an international category may have subcategories of Spanish, French, Chinese, and Japanese programming.

Each program will also have particular identifying data. For a sports program, this will include the names of the teams, UCLA v. University of Washington Huskies, if a live game or previously played, and other data associated with that program. If the program is a movie, the program data will provide the name of the director, the main actors, the producer, the studio, the year it was made, if it won any Oscars, and other data.

In some embodiments, related programming channel lists may also be generated. A related programming channel list would include, for a particular channel, other channels that are currently carrying programming that is related to (e.g., the same category as) programming that is currently airing on the particular channel. For example, if a user is viewing a sporting event on one channel, the user could access a related programming channel list to see which other channels are currently also carrying sports programming. Related programming channel lists are typically generated/updated so as to coincide with programming schedules, such that a user can obtain timely information about programming related to a currently viewed program.

A channel list may be transmitted to the EPG manager 100 in various ways. In some embodiments, the channel list is transmitted as metadata along with program content. For example, the channel list may be transmitted along with program content over a satellite network, cable network, Internet Protocol network, or the like. In other embodiments, the channel list is transmitted using a communication mechanism that is distinct from that used to transmit program content. For example, the program content may be transmitted via a satellite or terrestrial broadcast network, while the channel list is transmitted via a land-based Internet Protocol network.

The channel list is typically re-transmitted by the program distributor 106 to the EPG manager 100 from time to time. In one embodiment, the channel list is re-transmitted on a periodic basis, such as every ten minutes, every hour, or the like. In another embodiment, the channel list is re-transmitted whenever the program distributor 106 updates information therein. For example, if a new sports channel is added to programming distributed by the program distributor 106, an updated channel list including the new channel is transmitted to the EPG manager 100. In some embodiments, rather than transmitting an entire updated channel list, only differential information, such as added or removed channels, is transmitted.

The above description of the content distribution environment 102 and the customer premises 116, and the various devices therein, is intended as a broad, non-limiting overview of an example environment in which various embodiments of the inventive EPG manager may be implemented. FIG. 1 illustrates just one example of a content distribution environment 102 and that the various embodiments discussed herein are not limited to such environments. In particular, content distribution environment 102 and the various devices therein, may contain other devices, systems and/or media not specifically described herein.

Different architectures are contemplated. For example, rather than receiving program content via a satellite broadcast network as shown in FIG. 1, the receiving device 100 may receive programming via an Internet Protocol ("IP") network. In addition, the EPG manager 100 need not necessarily operate upon the receiving device 118. In some embodiments, the EPG manager 100 executes as a hosted, network-accessible application, as may be provided by a Web server and/or other infrastructure that is part of the information provider 138 or another system. In such an embodiment, the receiving device 118 may include a Web browser or other program used to interact with an electronic program guide provided by the remotely executing EPG manager 100.

Example embodiments described herein provide applications, tools, data structures and other support to implement an EPG manager that receives and presents lists of channels carrying related program content. Other embodiments of the described techniques may be used for other purposes, including content management or description generally. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. Aspects of an EPG Manager

FIG. 2 is a schematic illustrating example user interfaces provided by the prior art. In particular, FIG. 2 shows a user interface screen 210 displayed by the EPG manager 100 upon a presentation device 120 of a common type well known in the prior art. The menu 212 includes indications of multiple available channel lists. In this example, the menu 212 includes channel lists in the outdoor adventure, news, movies, sports, and world events.

The electronic program guide 212 includes rows 218a-218f that each display information about programming carried by a particular channel that has been preassigned to that program within the channel list. The information of rows 218a-218f is organized into fields 216a-216f, which respectively display a channel name 216a (or network name), channel number 216b, a current timeslot 216c, a second timeslot 216d, a third timeslot 216e, and a fourth timeslot 216f. Each of the timeslots 216c-216f display programming available during a particular 30-minute time period. For example, row 218b indicates that a channel named "ESPN Sports," at channel number 144, is playing a soccer event from 8:00-9:30 PM, followed by a darts event starting at 9:30 PM. In other embodiments, more or less information may be displayed and information may be displayed in a different manner. For example, additional timeslots and/or channels may be displayed, such as on presentation devices having dimensions that are suitable for displaying the additional information.

As shown in FIG. 2, there are a large number of channels that are available for the user to view. While only five channels are shown, starting at outdoor adventures on channel 12 and ending at world events on channel 344, there are sequentially numbered channels extending from channel 3 all the way up to channel 9,999. Thus, while not shown, there are channels 3-11 prior to channel 12, channels 13-143 in between the shown channels 12 and 144, and the like.

Thus, the user has available to them well over 1,000 channels and in many instances over 9,000 channels, including radio, from which they can select in order to view a particular program. This means that at any one time over a dozen football games might be being played at the same time on a Saturday or a Sunday on twelve different channels at the same time, or at times slightly offset from each other. For example, channel 4 may have the college football game of the week while in an overlapping time slot channel 5 may have the SEC game of the week, whereas channel 13 may have the local conference game of the week for the football conference in which the broadcasting channel is located. Other ESPN channels, such as channels 140-147 may have various regional football games or specialty channel games such as Notre Dame, Brigham Young University, Army, Navy, or other teams of high interest which might not be part of large established conferences. If a user has a high interest in various types of football games, they are put to the trouble of having to scroll through a number of different channels, for example looking at channel 4, then channel 5, and then searching to find the local conference, only to learn, after some searching, that it is on channel 13 that particular week, whereas at other times the desired football game may be on channel 147, channel 67, or some other sport channel. This is just one example, and the same problem occurs for many different types of events on a variety of channels. For example, at any one time there are probably more that a dozen and perhaps in excess of 100 movies playing on different movie channels, ranging from a Disney movie to a Hallmark movie, to a standard western movie, or any other of the many types of movies available. The particular channel on which a user's desired program will appear may change for different days of the week and for different parts of the year and different time slots. For example, if a viewer's favorite basketball team is the Los Angeles Lakers, in some instances the Lakers may play on a local Los Angeles station, whereas many times the Lakers may play on a Boston station or alternatively on an ESPN sports station. While other times the Lakers' game may be a championship series game that appears on a major network such as ABC or NBC and be located in one of the standard broadcast channel slots such as channel 4, 5, 7, or the like. The example shown in FIG. 2 is merely one illustration of the wide variety of the program content which is available and the wide range of channels on which the programs may appear.

Figure 3:
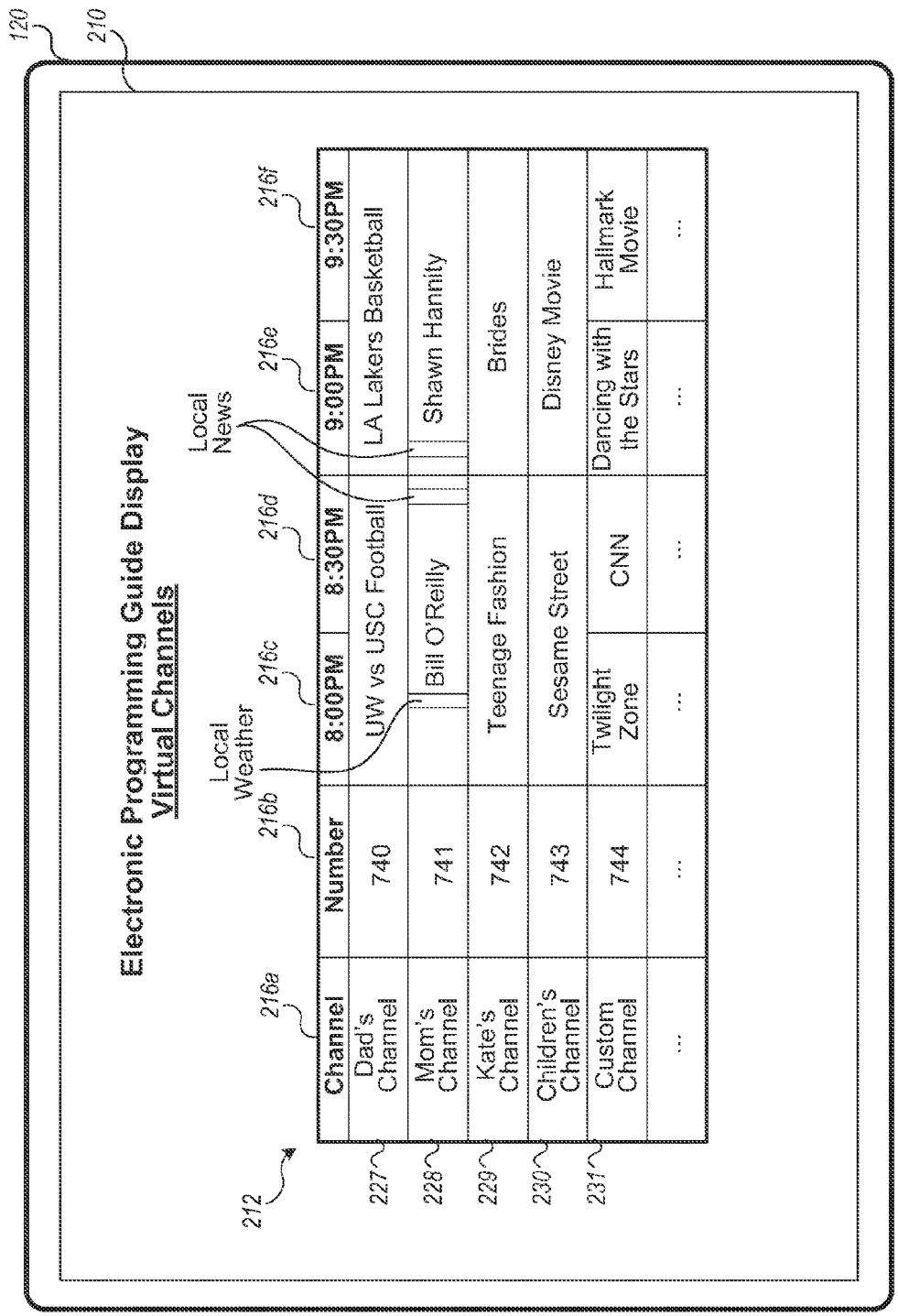
FIG. 3 is a schematic of a user interface screen of an electronic program guide according to one embodiment as disclosed herein.

FIG. 3 illustrates an organization of virtual channels according to one embodiment of the present disclosure herein. In this particular embodiment, one or more channels are set aside as virtual channels which have not been previously used by the content provider 104 and therefore would be blank channels or open channels in the system. In the examples shown, these channels range from 740 to 744, though of course it could included fewer or more channels and the channel numbers may be any selected channel that is available. In one embodiment, a single virtual channel 227 is provided, such as a first channel 740 that is a virtual channel for all users in the home. As an alternative, and in the embodiment shown in FIG. 3, the number of virtual channels can be quite large, for example one virtual channel for each household member or, in some embodiments, more than a dozen virtual channels so that each different user has their custom virtual channels and, in addition, the system creates, based on data collection, two or more virtual channels 231 which are not assigned to a particular person but represent the general viewing habits of the users of the customer premise 116.

Turning now to the example of FIG. 3, this illustrates five different virtual channels, a first channel 227 which is Dad's channel, a second channel 228 which is Mom's channel, a third channel 229 which is Kate's channel, a fourth channel 230 which is the children's channel, and a fifth channel 231 that is a custom channel and not associated with any particular user. These virtual channels 227-231 are second channels that are associated with or linked with a particular user. These second channels will be populated with program content that is duplicated from the channels that have been preassigned to carry particular programs and corresponds to those channels most frequently watched by the particular viewer associated with that virtual channel.

The content of the virtual channel is determined as follows. In one embodiment, a second channel, also called a virtual channel herein, is linked to or associated with a particular viewer. In this example, channel 227 is associated with a father or male adult in the home and in this case has been labeled "Dad's Channel." It is called a virtual channel because it is created by and exits in the local Electronic programming guide manager and is different from the pre-assigned channel for any particular program. Each time the user associated with that virtual channel is watching TV, the memory records the channel that he is watching. All of the metadata that is descriptive of the program content of that program is recorded in the memory 330 or 320, (see FIG. 4). This continues for a set period of time, for example one week, three weeks, or during the entire history of watching. After a certain period of recording, the virtual channel will have assembled the history of the viewing preferences of that particular user based on the descriptive criteria of the programs that the user has viewed within that selected period. Once a sufficient viewing history is assembled, the virtual channel 227 associated with that particular user will become populated with the shows that that viewer prefers to watch based on those that fall within the created set of descriptive criteria. In this example, the father is the type of person who prefers watching college football and, during basketball season, the Los Angeles Lakers. The system tracks that each time the viewer of the TV program is Dad, that he immediately checks the college football programs that happen to be on. Furthermore, if the University of Washington, his alma mater, is playing any sport, whether football, basketball, or the like, he will always be watching an athletic event that involves his alma mater. In addition, the system recognizes that every time the Los Angeles Lakers are playing a basketball game, the user of channel 740 will find the channel on which the Los Angeles Lakers playing and go to that channel to be sure to record and watch that program. In addition, the system tracks every event that is recorded on the DVR associated with that set-top box by a particular user. The system recognizes that the user of virtual channels 740 always records Laker basketball games and, in addition to watching all sports events of his alma mater, the University of Washington, he also video records all football games of the University of Washington Huskies football team. If neither the Los Angeles Lakers are playing or the University of Washington is playing, the viewer of virtual channel 740 will be tuned to a football sporting event in the Pac-12, and if such programs are not being shown will be viewing another sporting event of another type. The system tracks the viewing history and populates virtual channel 740 with the events most commonly viewed by the user of that channel. Thus, the channel 740 will always be showing a Los Angeles basketball game if one happens to be on on any channel. In addition, the system will show all sporting events of the University of Washington with a preference towards football if one or more events conflict with each other.

In one example, the college football with the University of Washington on one week is being shown on the Pac-12 channel 422, and another week is featured of the game of the week for ABC and thus is being shown on channel 4. Since the system has been trained to populate virtual channel 740 with the viewing preference of the user, the user does not need to search the channels to find where the University of Washington football channel is being broadcast. Instead, he merely turns to his preferred channel, channel 740, and can be assured that if the University of Washington is playing football, that it will be displayed on that channel. In the example shown in FIG. 3, the University of Washington is playing USC in football, a game of high interest to a UW fan, particularly in 2012. Similarly, if the Los Angeles Lakers are playing basketball, the virtual channel 740 will be the channel on which the Lakers will be shown. Of course, the college football game with the University of Washington will also be on the other channel, for example 422, channel 4, or any other channel which is displayed. Thus, the user could turn to those channels and watch those channels as well, however that is not necessary because the virtual channel 740 is populated with the appropriate game no matter which original channel it happens to be on.

If the user of channel 740 wishes to see the future schedule of broadcasting for all Lakers games, he does not need to visit multiple channels, he merely needs to go to his channel 740 and scroll into the future, even for several days, and all Lakers games scheduled on any channel will also appear on channel 740. This avoids him having to search various channels to see the stations and times that Lakers games might be played on the upcoming Tuesday, Wednesday and Friday. In addition, he can set to record channel 740 and be assured he will record every Lakes game.

The populating of the virtual channel with the appropriate program depending on the viewer's viewing history can be accomplished by a number of acceptable techniques. A database is assembled and stored that contains the metadata and descriptive criteria of programs that the user has been watching. When a future program is to be shown, its metadata or some set of its descriptive data will be compared to the database of viewed programs. The criteria of the future program will be compared with the stored criteria to determine if they have similar or identical features. For example, whether the future program a football game and if so, the names of the teams. The more number of descriptive criteria of the future program that are same of those in the database the closer the match. For example, if the future program has 12 descriptive criteria and 2 of them match the database, this would be considered a weak match; but if 8 of the them match, this would be considered a strong match.

The match can also be a weighed match that increase the value of the match the more times a user has viewed a program with that criteria in the past. For example, if a user watches primarily only football games and occasionally only basketball games, then the greater weight will be accorded the football games. Similarly, if the user has definite viewing patterns in certain time slots that repeated every time, then greater weight will be placed on the repeated programs viewed in the same time slots. For example, if the viewer always watches CNN at 6:00 p.m. and always watches Bill O'Reilly at 8:00 p.m. and has no cases in which this pattern changes, greater weight will be placed on this program criteria. Similarly, if the viewer always turns to the Weather Channel when it is showing local weather or some other local weather reporting service for a short time during at time slots between the hours of 6:00 p.m. 9:00 p.m., then greater weight will be placed on a channel showing local weather during that broad time period.

According to one embodiment, channel 740 contains an address redirection, a pointer, or some other indication that links it to the true channel on which the program is being provided. For example if the football game is being broadcast on channel 4, the system will find the University of Washington game being broadcast on channel 4 and will provide an address link from the virtual channel 740 to channel 4, so that as far as the viewer is concerned, he is watching 740, but in fact the program content is being duplicated at 740 by an address redirection from channel 4. Similarly, the channel 740 may carry a duplicate of whatever channel the Los Angeles Lakers happen to be playing on, using an internal pointer or address redirection. According to another embodiment, the actual channel on which the program is being displayed, such as channel 4, will be reassigned to be displayed at channel 740. Preferably, it will also be displayed on its home channel, on which it was originally being broadcast, so that the same program is being shown on the virtual channel 740 at the same time that it is being shown on its original channel, such as channel 4, ABC.

A second embodiment and example can be provided with respect to Mom's channel 228, which has been associated with the mother or adult female of the home and her viewing habits. In this example, Mom's channel 228 has virtual channel number 741. The mother always watches CNN at 6:00 p.m., but likes to watch Bill O'Reilly, which comes on at 8:00 PM on Fox News. Then, following the Bill O'Reilly show, she likes to watch Sean Hannity, which also happens to be on Fox News. The system memory also recognizes, however, that she does not like commercials at all. Instead, each time a commercial comes up on Bill O'Reilly, she does one of two things: she either pauses the system, putting it on pause until the commercial is over, and once the commercial is over, fast-forwards to the programming of Bill O'Reilly again, or, alternatively, during the commercials turns to the local weather forecast. The inventive embodiment herein recognizes that at least once before noon and twice after supper she switches stations to try and locate the most current local weather forecast. (This is because she has to be concerned about what her children will be wearing to school the next day and the various weather which may occur.) Thus, during the commercial break, she has the habit of instead of watching the commercials, changing channels to two or three different other channels to find the current local weather forecast for the region in which she lives, in this case, Seattle, Wash. After a certain period of time, such as seven days, three weeks, or over her history of viewing, the system records her viewing habits and recognizes that at least twice after 7:00 pm, during any commercial, she does not stay on the same station, and instead switches to the local weather station. Accordingly, channel 741 will be populated with a variety of different stations. When Bill O'Reilly is on, this will be shown on channel 741. However, when a commercial appears, the virtual channel 741 will then display any channel which is showing the current local weather forecast for Seattle, whether it's channel 13, The Weather Channel 214, channel 4 ABC News, or any appropriate channel showing the weather report. If, during the first commercial break, no local weather forecast can be found on any of the other channels, then the system will either pause (another habit) or turn to the local news or some other station based on the stations which the user of virtual channel 741 views when the weather is not available. However, the station will always search for the weather first, since the viewing history of the user of channel 741 indicates that they have a high interest in seeing the weather during the first commercial break from the program that she is now watching. Once the commercial break is over on the currently being watched program, the channel will switch from the weather program back to the current program so that the viewer continues to see the current program, in this case the Bill O'Reilly show. Then, during the next commercial break, channel 741 will switch to display the local news, in the event the local weather forecast has been previously viewed with the same program. In the event the prior commercial break did not result in the weather forecast being found on another station during the break, then during the second commercial break another attempt will be made to find and show the local weather forecast. However, if, during the first commercial break, the local weather forecast was located and displayed, then during the second commercial break a different station will be broadcast, such as the local news or whatever station the user of virtual channel 741 commonly changes to during commercials.

Since the virtual channel has a recorded history of the viewing preferences for the particular user associated with that channel, the channel will be populated with those programs which will most closely match the viewing history of that particular user. A similar population occurs for the virtual channel 229, which is titled "Kate's Channel," the children's channel 230, and a custom channel 231. Each of these virtual channels will be associated with a particular viewer or, in the case of the custom channel, associated with the aggregate viewing habits of all the viewing habits of all the viewers in the home, and will display, on the virtual channel, the particular programs which most closely match the viewing history for the person or household associated with that particular virtual channel.

A user can be associated with a particular virtual channel by any number of acceptable techniques. For example, according to one technique, when the user is holding the remote control, the virtual channel is displayed with a query asking the user to press a selected key sequence to identify a particular user and link that user to the virtual account. Thereafter, each time the user begins to view the TV program, they start by inputting the button sequence to alert the TV to the identify of the user that is viewing the program. The button sequence can be any acceptable sequence selected by a particular user, for example, pressing the replay button twice in a row, pressing the mute button four times in a row, pressing a selected sequence of key buttons, such as 740, to identify that the user is associated with the virtual channel 740, after which the channel they desire to watch is pressed, or any other particular sequence. In a preferred embodiment, the user inputs the buttons associated with the particular virtual channel to which they wish to be associated. For example, when the dad begins to view the TV, the first buttons he will push are 740, as an indication that he is the user of virtual channel 740. After this, he can continue to watch channel 740 if it is showing the programs populated that he prefers. Or, he can at any time change to a new channel, and the system will recognize that he has a viewing preference other than what is currently on channel 740, will record this new viewing preference, and take this into account in populating channel 740 with programs in the future.

In carrying out the population of the virtual channel with the preferred viewing channels, the system records the entire program content for a selected period of time. For example, all TV programs being broadcast can be recorded for a selected period of time, such as one week, one month, or some other time period. This recording can take place at the local DVR, in the cloud, or any other acceptable memory location which can store the program content. The DVR in current machines holds a terabyte of data and thus can record in the background 100% of all programs for several weeks, then erase them or roll over a new week while erasing an oldest week. Thus, since the entire data stream is being recorded, the system can track which shows are being preferred of those that are available at the time based on the viewing history of what is actually viewed as compared to what is available to be viewed. The system then provides a weighting of the particular programs which are being watched, and the frequency with which they are being watched, as compared to the other programs which are available but not watched. For example, a viewer may frequently like to watch westerns, however, if a western is being shown at the same time as a sporting event, such as college football, the user will always select college football, then the virtual channel will provide a western to show on the virtual channel if one is available, but if it conflicts with a college football game, will substitute the college football game for the western. The entire content can be stored for a selected time period, for example seven days or 14 days, in order to not consume huge amounts of memory resources. The viewing habits of the last several days are the ones which are used to provide the weighting and preference for those shows which are displayed on the virtual channel. The recorded days can be a dynamic time period window. For example, with each day that passes, a new day can be added to the window and the oldest day dropped off, so that it no longer has an effect on the channels which are being selected for use in the virtual channel. The length of the moving day window can be any length desired by the system, for example, 14 days, 21 days, 30 days, or the like.

The electronic programming guide looks forward for several days into the future to determine which future events match the past viewing event preference of the viewer associated with that particular virtual channel. The system will therefore present, on the virtual channel, those programs to come to a future time periods which most closely match the past viewing habits of that particular user. The user can scroll into the future, just as if it were a real channel or standard EPG to see future programs the virtual channel will provided for him to view.

In one embodiment, the virtual channel is not associated with any particular user, but rather tracks a history of all channels viewed by all users and viewers in the home. This particular is shown as the custom channel 231, which is virtual channel 744. This channel accumulates the viewing history of all the users in the home, and displays on the virtual channel 744 the viewing preferences for all users in the home.

The virtual channel can contain either live events, or recorded content which has been recovered from events that had previously been recorded on the local hard drive. For example, in one embodiment, a particular viewer may enjoy watching NCSI. Further, the system memory indicates that NCSI is recorded each day when it occurs during the middle of the day, but is played back each night between 9:00 PM and 10:00 PM. Accordingly, the system will record NCSI when it is broadcast any time during the day, whether 4:00 PM, 6:00 PM, or any other time. Then, on the virtual channel, the program displayed between the hours of 9:00 PM and 10:00 PM will always be the most recent recorded NCSI episode.

The system can provide a weighting to the different program content depending on a number of factors. The factors may include the frequency with which a program is watched compared to when it is available, the selection of one program over another program when both are broadcast simultaneously, the time of day that a program is being watched, whether an event has been recorded and then watched a second, third, or fourth time, or any number of other factors. The weighting is organized to recognize those shows which have the highest preference for the viewer of the particular virtual channel. Thereafter, in any particular time slot, whether 4:00 PM, 6:00 PM, 8:00 PM or the like, the virtual channel will display during that time slot the program which the user most likely is to prefer seeing at that particular time slot of those channels which are available. And, if the user generally prerecords a program and watches it at a different time slot, the system will track what is recorded and then redisplay the recorded event in the virtual time period, generally in the same time slot in which it is most frequently being watched.

The system engages in dynamic learning in modifying what is being displayed on each of the virtual channels, and uses a heuristic approach in order to track the dynamic programming. As the user viewing habits change, the system will recognize the change in habits and will populate the virtual channel with the viewing habits most recently associated with the user of the virtual channel. For example, assume that Dad's Channel 227 is populated with football programs during football season. On the other hand, once basketball season starts, the system after seven days will recognize that the user of channel 740 prefers certain types of basketball games over college football games, unless the football game is a bowl game. Thus, the system will adaptively learn to display basketball games instead of old football games, as the sports season changes from football to basketball. Even though one or more football games may be showing as replayed games on an ESPN channel, the system will recognize that the viewer prefers to watch a live basketball game to a previously played football game. And, as previously noted, the system will recognize that any time the Los Angeles Lakers are playing basketball, that they are given a preference for viewing over any other events that might be occurring. The user's profile is therefore dynamically modified in order to track the most recent viewing habits of the user and to give less weight to older viewing habits. Namely, the system can record and track viewing habits of the last 30 days, but be programmed to give a greater weight, such as a weight of 2:1, to the viewing habits of the last 7 days over the viewing habits of the 7-day period which occurred a month prior. As the viewing habits continue to change, the actual programs which are shown on a particular virtual channel, such as 740, 741, 742 will also be modified to match the habits of a particular user.

Over time, once the virtual channel has appropriately learned the preferred channels, the user may continue to watch only the virtual channel for extended periods of time. For example, the user may watch channel 740 for several weeks if it correctly shows the programs which he desires to view. In this instance, the weighting, of the channels being shown will be reinforced as having been correct. Accordingly, the system will record that it was able to properly predict and show the preferred program content on the virtual channel 740, and will give increased weighting to that particular program in the future. Thus, the user can, over time, watch the virtual channel exclusively, and be assured that it will be populated with the programs that he or she prefers to view. Further, by staying on channel 740, if another program is being shown on a different channel, the viewer will not need to change channels, but rather, as the new program starts on a different channel than the old program was being shown, that program will be redirected to display also on channel 740, so the user does not have to change stations, but can continue to watch channel 740.

C. Example Computing System Implementation

Figure 4:
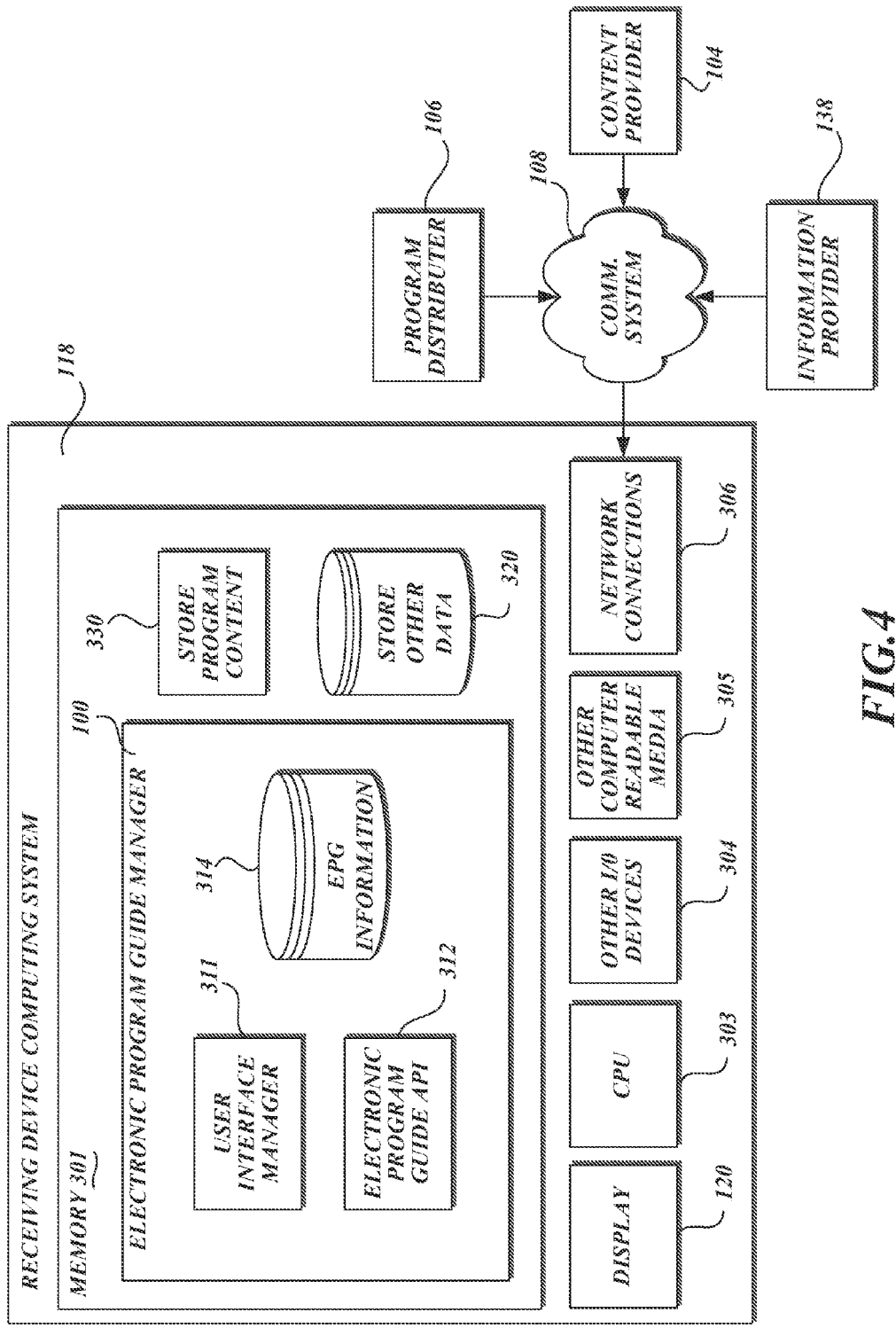
FIG. 4 a schematic of an electronic program guide management system according to one embodiment as disclosed herein.

FIG. 4 is a block diagram of a computing system for practicing example embodiments of an EPG manager. FIG. 5 shows a receiving device computing system 118 that may be utilized to implement an EPG manager 100. In one embodiment, the receiving device computing system 300 includes a set-top box configured to receive and display programming on a presentation device. In other embodiments, the receiving device computing system 300 is part of a presentation device, such as a television.

Note that one or more general purpose or special purpose computing systems/devices may be used to implement the EPG manager 100. In addition, the computing system 300 may comprise one or more distinct computing systems/devices and may span distributed locations. Furthermore, each block shown may represent one or more such blocks as appropriate to a specific embodiment or may be combined with other blocks. Also, the EPG manager 100 may be implemented in software, hardware, firmware, or in some combination to achieve the capabilities described herein.

In the embodiment shown, receiving device computing system 300 comprises a computer memory ("memory") 301, a display 120, one or more Central Processing Units ("CPU") 303, Input/Output devices 304 (e.g., keyboard, mouse, CRT or LCD display, and the like), other computer-readable media 305, and network connections 306. The EPG manager 100 is shown residing in memory 301. In other embodiments, some portion of the contents, some of, or all of the components of the EPG manager 100 may be stored on and/or transmitted over the other computer-readable media 305. The components of the EPG manager 100 preferably execute on one or more CPUs 303 and facilitate the re-recording of disrupted programming, as described herein. Other programs are stored in memory 330 and potentially other data repositories, such as data repository 320, also reside in the memory 301. The memory 330 for storing program content may be on the local DVR, at the content provider, or on the cloud. It does not need to be physically located within the memory of the set-top box 118 itself, but that is one acceptable option. Of note, one or more of the components in FIG. 4 may not be present in any specific implementation. For example, some embodiments may not provide other computer readable media 305 or a display 302.

In a typical embodiment, the EPG manager 100 includes a user interface manager 311, an electronic program guide application program interface ("EPG API") 312, and a data repository 315 that includes EPG information. The EPG manager 100 interacts via the communication system 108 with program distributor 106, content provider 104, and/or information provider 138, as discussed with respect to FIG. 1.

The user interface manager 311 provides a view and a controller that facilitate user interaction with the EPG manager 100 and its various components. For example, the user interface manager 311 provides interactive graphical user interface screens such as those described with respect to FIGS. 2 and 3. As discussed, such user interfaces allow the user to be associated with a particular virtual channel, view a channel list within an electronic program guide, configure the operation of the EPG manager 100, and the like. The user interface manager 311 also receives input from a user (e.g., in the form of user interface events generated by a remote-control device or other input device) and translates those inputs into the appropriate command for initiation by the EPG manager 100.

The EPG API 312 provides programmatic access to one or more functions of the EPG manager 100. For example, the API 312 may provide a programmatic interface to functions of the EPG manager 100 that may be invoked by one of the other programs 330 or some other module. In this manner, the API 312 may facilitate the development of third-party software, such as user interfaces, plug-ins, adapters (e.g., for integrating functions of the EPG manager 100 into desktop applications), and the like.

In addition, the API 312 may be in at least some embodiments invoked or otherwise accessed via remote entities, such as program distributor 106, the content provider 104, or the information provider 138. For example, the information provider 138 may transmit ("push") channel list information to the EPG manager 100, by invoking one or more functions of the API 312. As another example, EPG manager 100 may make it stored channel list information available to other systems (e.g., a home computing system) via the API 312.

The data repository 314 stores EPG information, such as one or more channel lists. It will also store the metadata associated with each program that has been viewed. The channel lists may be represented in various ways, such as via one or more database records or text files. In addition, channel lists may include version information, such that the EPG manager 100 can determine when a channel list is out of date with respect to updated channel list information received from the program distributor 106 or other source. EPG information may also include configuration information used by the EPG manager 100, such as indications of display settings, filtering settings, and the like. The EPG information stored in memory 314 will include the identity of the virtual channel and the association of these channels with a particular user or household.

In some embodiments, the EPG manager 100 interacts with the program distributor 106, the content provider 104, and/or the information provider 138 for various purposes. As noted, the EPG manager 100 typically obtains channel lists from the program distributor 106, either as metadata transmitted along with (e.g., over the same communication mechanism) program data, or via a distinct communication mechanism. In other embodiments, the computing system 300 receives program data from one source, such as the program distributor 106, while the EPG manager 100 receives channel lists (and possibly other information) from another source, such as the content provider 104 and/or the information provider 138.

In an example embodiment, components/modules of the EPG manager 100 are implemented using standard programming techniques. For example, the EPG manager 100 may be implemented as a "native" executable running on the CPU 303, along with one or more static or dynamic libraries. In other embodiments, the EPG manager 100 may be implemented as instructions processed by a virtual machine that executes as one of the other programs 330. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by an EPG manager implementation. Also, other functions could be implemented and/or performed by each component/module, and in different orders, and by different components/modules, yet still achieve the functions of the EPG manager.

In addition, programming interfaces to the data stored as part of the EPG manager 100, such as in the data repository 315, can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 315 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of an EPG manager.

Furthermore, in some embodiments, some or all of the components of the EPG manager 100 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The illustrated program distributor 106, content provider 104, and information provider 138 may be implemented using techniques similar to those described above. That is, each of the program distributor 106, content provider 104, and information provider 138 may comprise one or more computing systems similar to computing system 300, and include functionality implemented by way of a suitable arrangement of hardware, firmware, and/or software components.

FIG. 5 is a flow diagram illustrating one example for populating a virtual channel for a particular user. At a first part of the sequence 332, the program content of all programs received at the set-top box are recorded, including the metadata and all data from the data strain as shown in step 332. Also at the beginning part of the sequence, either before or after the recording of the data, a virtual channel is associated with one or more users in step 334. In a subsequent step, 336, a record is made of all of the programs which have been watched by the user, including a recording of all the metadata of all programs reviewed by a particular user. As the recording of the metadata and the list of programs is carried out, a sequence question is asked in step 338 as to whether sufficient programs have been viewed or sufficient data collected in order to create a reliable viewing history. If the answer is no, that sufficient has not been recorded to provide a reliable viewing history, then the sequence returns to step 336 to continue to record the list of programs which have been watched and the metadata for such programs. Once sufficient data has been collected such that the response to step 338 is yes, then the virtual channel is set up in step 340, and in the virtual channel a display is provided of the most frequently viewed programs that a user would be expected to want to view. Thereafter, the user may view any of the programs presented on the virtual channel and use that as his sole or primary channel which he watches. As the user continues to view the virtual channel, those programs which are being displayed on the channel will be recorded as his preferred channel and will reinforce that the current programs which have been selected for the virtual channel are correct. Thus, the programs which are viewed on the virtual channel will be added to the database as being preferred programs and will provide further data points in order to populate the virtual channel in the future. If the user changes stations to view other programs, then this data will also be collected along with the list of all other programs viewed and the metadata for such programs and this will be used to modify and update the programs which are shown on the virtual channel. Thus, step 338 will continue even after the virtual channel has been created in step 340.

FIG. 6 illustrates an example in which a virtual channel has already been set up and may be modified going forward into the future. As illustrated in FIG. 6, after the virtual channel has been set up, the set-top box will continue to record a list of all programs presented and the metadata for all programs on the TV as well as all programs which have been viewed by the user as in step 400. The algorithm will sort the programs which have been viewed by the user as compared to those which have not been viewed by the user and use both the data for the programs watched and the data for the programs not watched in order to determine which programs the user prefers to view, including resolving potential conflicts when two programs are on concurrently that the user may have viewed in the past and to determine which of the programs the user prefers of the two when both are on together.

At the same time that a recording is being carried out of a list of all programs and the metadata for such programs, the step 402 in the program is asking in a query whether sufficient additional programs have been viewed to update the frequently viewed list. If the answer is no, the virtual channel will remain unchanged in its selection of which types of programs to present to the user and a record will continue to be stored in memory of the list of programs which have been viewed as compared to those programs which are available and not viewed, as well as the metadata for all programs. Once sufficiently additional programs have been viewed to update the frequently viewed list in step 402, the program will advance to the next step 404 in which the virtual channel is revised based on the most recently viewed programs. As previously mentioned in the specification, the revision of the programs can occur in a dynamic window in which each time a day is added, the oldest day is dropped so that over time the most recently viewed programs are those which affect those programs which are shown on the virtual channel. In step 406, there is a modification of the programs which are presented on the virtual channel based on the revised most frequently viewed program list. Such revisions and modifications of steps 400 to 406 continue such that at the end of the program step as shown in FIG. 6, it returns to the start in a loop so that the list of programs continues to be recorded, along with the metadata of all programs so that the updating can continue on a dynamic basis.

While various embodiments have been described hereinabove, it is to be appreciated that various changes in form and detail may be made without departing from the spirit and scope of the invention(s) presently or hereafter claimed.

The invention claimed is:

1. A method comprising:
inputting to a receiver a plurality of video programs associated with preassigned channels, the channels being listed on an electronic programming guide;
presenting to a user the electronic programming guide that has the plurality of channel shown thereon and listed adjacent to their respective preassigned channel;
recording descriptive data associated with the content of each video program of the plurality of video programs that a user views via the receiver over a selected time period;
creating a set of descriptive criteria for the content of programs which the user has viewed over the selected time period;
identifying a future video program that is yet to be viewed that has content that falls within the created set of criteria, the future video program having a preassigned channel associated with it;
associating the future video program with a second channel that is linked with that user, the second channel being different from the preassigned channel;
presenting the future video program on the second channel that is linked to that user on an electronic programming guide, the second channel being different from the preassigned channel for that particular program;
identifying two future programs to be presented to the receiver that are yet to be viewed that each have content that falls within the created set of criteria, the two programs being broadcast in a same time slot on different preassigned channels;
comparing the descriptive data of the two future programs to the set of descriptive criteria;
determining which of the two programs is a closer match to the descriptive data of viewed programs, wherein the step of determining which of the two programs is a closer match to the descriptive data of viewed programs includes:
  identifying the number of times within the selected time period that the user has viewed different video programs having nearly similar descriptive data with each other; and
  giving a greater weight to the descriptive data if the user has viewed multiple programs having similar descriptive data; and
associating the determined future program of the two programs that is the closer match with the second channel that is linked with the user for that particular time slot.

2. The method according to claim 1 wherein the user is represented by a group of individuals within a single household.

3. The method according to claim 1 wherein the user is a single individual.

4. The method according to claim 3 further including:
linking the second channel to specific individual user prior to the step of recording descriptive data associated with the content of each video program.

5. The method according to claim 1 further including:
recording descriptive data associated with the content of each video program of the plurality of video programs that the user does not view; and,
comparing the descriptive criteria of the programs that the user has viewed with the descriptive criteria of programs the user did not view to as part of the step of identifying whether a future video program that is yet to be viewed has content that falls within the created set of criteria.

6. The method according to claim 1 wherein the type of descriptive data is whether the program is a live sports contest.

7. The method according to claim 6 wherein the type of descriptive data is whether the program is a football game.

8. The method according to claim 1 wherein the type of descriptive data is weather channel.

9. The method according to claim 1 further including:
identifying that the video stream to be presented on the second channel is a commercial and has different content from the program;
presenting a second future video program on the second channel during the time that a commercial is in the video stream of the future video program; and
returning to the future video program and ending the presentation of the second video program when the commercial is no longer part of the video stream of the program.

10. The method according to claim 9 wherein the second future video channel to be presented is selected based on another video channel that meets the descriptive criteria being presented to the receiver in the same time slot as the future video program.

11. The method according to claim 9 further including:
determining whether the user pauses a program during a commercial when viewing programs;
determining whether the user changes channels during a commercial when viewing live programs; and
changing the second channel to the second future program if the user has history of either pausing a program during a commercial or changing channels during a commercial.

12. A method comprising:
inputting to a receiver a plurality of video programs associated with preassigned channels;
presenting to a user on a video display at least one program in a selected time slot from the plurality of video programs;
recording descriptive data associated with the content of each video program of the plurality of video programs that a user views over a selected time period;
creating a set of descriptive criteria for the content of programs which the user has viewed over the selected time period;
identifying a future video program that is yet to be viewed that has content that falls within the created set of criteria, the future video program having a preassigned channel associated with it;
associating the future video program with a second channel which is different from the preassigned channel;
presenting the future video program on the second channel, the second channel being different from the preassigned channel for that particular program;
identifying two future programs to be presented to the receiver that are yet to be viewed that each have content that falls within the created set of criteria, the two programs being broadcast in a same time slot on different preassigned channels;
comparing the descriptive data of the two future programs to the set of descriptive criteria;
determining which of the two programs is a closer match to the descriptive data of viewed programs, wherein the step of determining which of the two programs is a closer match to the descriptive data of viewed programs includes:
  identifying the number of times within the selected time period that the user has viewed different video programs having nearly similar descriptive data with each other; and
  giving a greater weight to the descriptive data if the user has viewed multiple programs having similar descriptive data; and
associating the determined future program of the two programs that is the closer match with the second channel that is linked with the user for that particular time slot.

13. A method according to claim 12 further comprising:
presenting the future video program on both its preassigned channel and the second channel at the same time.

14. A set-top box configured to receive program content and output program content to a video presentation device, the set top box comprising:
an electronic program guide manager that is configured, when executed, to:
present to a user an electronic programming guide that has the plurality of channel shown thereon and listed adjacent to a respective preassigned channel number;

record descriptive data associated with the content of each video program of the plurality of video programs that a user views via the receiver over a selected time period;

create a set of descriptive criteria for the content of programs which the user has viewed over the selected time period;

identify a future video program that is yet to be viewed that has content that falls within the created set of descriptive criteria, the future video program having a preassigned channel associated with it;

associate the future video program with a second channel that is linked with that user, the second channel being different from the preassigned channel;

present to the user the electronic programming guide having the second channel shown thereon with the associated future video program being associated with the user linked channel;

identify two future programs to be presented to the receiver that are yet to be viewed that each have content that falls within the created set of criteria, the two programs being broadcast in a same time slot on different preassigned channels;

compare the descriptive data of the two future programs to the set of descriptive criteria;

determine which of the two programs is a closer match to the descriptive data of viewed programs, wherein the step of determining which of the two programs is a closer match to the descriptive data of viewed programs includes:

identify the number of times within the selected time period that the user has viewed different video programs having nearly similar descriptive data with each other; and give a greater weight to the descriptive data if the user has viewed multiple programs having similar descriptive data; and associate the determined future program of the two programs that is the closer match with the second channel that is linked with the user for that particular time slot.

15. The set-top box according to claim 14 wherein the future video program is presented at the same time on both the second channel and its preassigned channel in the electronic programming guide.

* * * * *